United States Patent
Martin (12) 
(10) Patent No.: US 11,174,022 B2
(45) Date of Patent: Nov. 16, 2021

(54) SMART DEVICE FOR PERSONALIZED TEMPERATURE CONTROL

(71) Applicant: INTERNATIONAL BUSINESS MACHINES CORPORATION, Armonk, NY (US)

(72) Inventor: Richard L. Martin, Jamaica Plain, MA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 16/132,921

(22) Filed: Sep. 17, 2018

(65) Prior Publication Data
US 2020/0086983 A1  Mar. 19, 2020

(51) Int. Cl.
| | |
|---|---|
| *B64C 39/02* | (2006.01) |
| *F24F 11/65* | (2018.01) |
| *H04W 4/021* | (2018.01) |
| *G06F 3/01* | (2006.01) |

(52) U.S. Cl.
CPC ............ *B64C 39/024* (2013.01); *F24F 11/65* (2018.01); *G06F 3/011* (2013.01); *H04W 4/021* (2013.01); *B64C 2201/12* (2013.01)

(58) Field of Classification Search
CPC .... B64C 39/024; B64C 2201/12; F24F 11/65; F24F 2221/42; H04W 4/021; G06F 3/011
USPC .......................................................... 701/2
See application file for complete search history.

(56) References Cited

U.S. PATENT DOCUMENTS

| | | | | |
|---|---|---|---|---|
| 3,053,480 | A * | 9/1962 | Vanderlip | B64C 27/54 244/17.13 |
| 5,021,980 | A * | 6/1991 | Poenisch | G01J 5/60 374/120 |
| 8,444,747 | B2 | 5/2013 | Kristensson et al. | |
| 8,725,842 | B1 | 5/2014 | Al-Nasser | |
| 9,094,816 | B2 * | 7/2015 | Maier | H04W 4/70 |
| 9,223,134 | B2 * | 12/2015 | Miller | G06Q 30/02 |
| 9,288,829 | B2 | 3/2016 | Park et al. | |
| 9,341,843 | B2 * | 5/2016 | Border | G06F 1/163 |
| 9,366,862 | B2 * | 6/2016 | Haddick | G06F 1/163 |
| 9,456,787 | B2 | 10/2016 | Venkatraman et al. | |
| 9,650,134 | B2 * | 5/2017 | Chappell | B64D 47/08 |
| 9,759,917 | B2 * | 9/2017 | Osterhout | G02B 27/0093 |

(Continued)

FOREIGN PATENT DOCUMENTS

| | | | | |
|---|---|---|---|---|
| CN | 102439393 | A * | 5/2012 | ........... G01S 17/003 |
| CN | 103604191 | A * | 2/2014 | |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Behrang Badii
*Assistant Examiner* — Jalal C Coduroglu
(74) *Attorney, Agent, or Firm* — Anthony M. Pallone (57) ABSTRACT

An embodiment of the invention may include a processor-implemented method and computer program product for temperature control. The embodiment may include performing, by at least one unmanned aerial vehicle, at least one local climate control action at a location based on data received from a wearable computing device of at least one individual.

19 Claims, 7 Drawing Sheets

(56) References Cited

U.S. PATENT DOCUMENTS

| | | | |
|---|---|---|---|
| 9,896,202 B2* | 2/2018 | Jourdan | G05D 1/042 |
| 9,925,936 B2* | 3/2018 | Rai | B60W 50/0098 |
| 9,936,358 B2* | 4/2018 | Gruteser | G01C 21/16 |
| 10,075,828 B2* | 9/2018 | Horton | H04L 12/2829 |
| 10,146,198 B2* | 12/2018 | Salter | G05B 15/02 |
| 10,255,816 B2* | 4/2019 | Bartel | G08G 1/202 |
| 10,316,542 B2* | 6/2019 | Gharabegian | E04H 15/02 |
| 10,474,118 B2* | 11/2019 | Boicey | H04L 51/24 |
| 10,495,421 B2* | 12/2019 | Abramov | G05D 1/0016 |
| 10,535,195 B2* | 1/2020 | Seiler | B64C 27/008 |
| 10,678,233 B2* | 6/2020 | Celia | G06K 9/6263 |
| 2014/0275852 A1 | 9/2014 | Hong et al. | |
| 2015/0015502 A1 | 1/2015 | Al-Nasser | |
| 2015/0229906 A1 | 8/2015 | Inacio De Matos et al. | |
| 2016/0018640 A1* | 1/2016 | Haddick | G06T 19/006 348/78 |
| 2017/0036777 A1* | 2/2017 | Martin | B64F 1/12 |
| 2017/0076610 A1* | 3/2017 | Liu | H04W 4/021 |
| 2017/0193707 A1* | 7/2017 | Seiler | B64D 31/06 |
| 2017/0205897 A1* | 7/2017 | Chun | G06F 3/03 |
| 2017/0235918 A1* | 8/2017 | Hagen | G16H 10/60 705/2 |
| 2017/0336771 A1* | 11/2017 | Salter | G05B 15/02 |
| 2017/0337826 A1* | 11/2017 | Moran | G05D 1/0088 |
| 2018/0032126 A1* | 2/2018 | Liu | G06K 9/00302 |
| 2018/0164179 A1* | 6/2018 | Bagasra | B64D 1/18 |
| 2018/0187447 A1* | 7/2018 | Gharabegian | F21V 33/0004 |
| 2018/0292826 A1* | 10/2018 | DeFelice | G08G 5/0091 |
| 2018/0297699 A1* | 10/2018 | Ortiz | G05D 1/104 |
| 2019/0064343 A1* | 2/2019 | Zangvil | G01S 3/02 |
| 2019/0088156 A1* | 3/2019 | Choi | F41G 7/2293 |
| 2019/0135403 A1* | 5/2019 | Perry | B64C 1/068 |
| 2019/0385057 A1* | 12/2019 | Litichever | H04L 63/14 |
| 2019/0385364 A1* | 12/2019 | Joseph | G06T 17/00 |
| 2020/0086983 A1* | 3/2020 | Martin | G06F 3/011 |
| 2020/0150696 A1* | 5/2020 | Womble | E01H 1/006 |
| 2020/0202471 A1* | 6/2020 | Barak | G06Q 50/265 |
| 2020/0294401 A1* | 9/2020 | Kerecsen | G05D 1/0287 |
| 2020/0364930 A1* | 11/2020 | Buys | G06T 19/003 |
| 2020/0389469 A1* | 12/2020 | Litichever | H04L 63/1425 |

FOREIGN PATENT DOCUMENTS

| | | | | |
|---|---|---|---|---|
| CN | 103604191 B | * | 4/2016 | |
| CN | 106470901 A | * | 3/2017 | G01S 19/05 |
| CN | 206871123 U | | 1/2018 | |
| CN | 109753094 A | * | 5/2019 | |
| CN | 208998157 U | * | 6/2019 | |
| CN | 110512607 A | * | 11/2019 | |
| KR | 20140074185 A | * | 6/2014 | G06Q 10/06 |
| KR | 20150131403 A | * | 11/2015 | B60L 53/122 |
| KR | 20170031853 A | * | 3/2017 | A61B 5/1171 |
| KR | 20170132757 A | * | 12/2017 | G01L 5/0004 |
| KR | 20180030055 A | * | 3/2018 | H04W 4/90 |
| KR | 20180089066 A | * | 8/2018 | G06F 16/9535 |
| WO | WO-2012037290 A2 | * | 3/2012 | G02B 27/017 |
| WO | 2013025040 A2 | | 2/2013 | |
| WO | WO-2013049248 A2 | * | 4/2013 | G02B 27/0176 |
| WO | WO-2015123751 A1 | * | 8/2015 | G06F 16/22 |
| WO | WO-2015130950 A2 | * | 9/2015 | G01S 19/05 |
| WO | WO-2017149526 A2 | * | 9/2017 | G01B 11/026 |
| WO | WO-2017176550 A1 | * | 10/2017 | G01C 21/3415 |
| WO | WO-2017204926 A1 | * | 11/2017 | H04W 4/021 |
| WO | WO-2018122830 A1 | * | 7/2018 | B64C 39/024 |

* cited by examiner

SMART DEVICE FOR PERSONALIZED TEMPERATURE CONTROL

BACKGROUND

The present invention relates, generally, to the field of unmanned aerial vehicles, and more specifically, to an unmanned aerial vehicle for personalized temperature control.

An unmanned aerial vehicle (UAV), commonly known as a drone, in an aircraft without a human pilot aboard. UAVs may be a component of an unmanned aircraft system which may include a UAV, a ground-based controller, and a system of communications between the UAV and the ground-based controller. The flight of UAVs may operate with various degrees of autonomy from under remote control by a human operator to autonomously by onboard computers. While UAVs originated mostly in military applications, the use of UAVs are rapidly expanding to commercial, scientific, recreational, agricultural, and other applications.

BRIEF SUMMARY

An embodiment of the invention may include a processor-implemented method and computer program product for temperature control. The embodiment may include performing, by at least one unmanned aerial vehicle, at least one local climate control action at a location based on data received from a wearable computing device of at least one individual.

Optionally, an embodiment may further include determining the location and at least one quantitative attribute of the at least one individual based on the data, determining at least one instruction for the at least one unmanned aerial vehicle based on the at least one quantitative attribute, and communicating the at least one instruction to the at least one unmanned aerial vehicle.

An embodiment of the invention may include an unmanned aerial vehicle for performing personalized temperature control in combination with a wearable computing device. The unmanned aerial vehicle may include: a housing unit; at least one movement mechanism coupled to the housing unit to provide aerial movement; a heating unit; a cooling unit; a directional fan; and a controller operatively coupled to the at least one movement mechanism, the heating unit, the cooling unit, and the directional fan. The controller may include a processor that is responsive to executable computer instructions to control the at least one movement mechanism, the heating unit, the cooling unit, the directional fan, and to perform at least one temperature-related action.

DETAILED DESCRIPTION

Unmanned aerial vehicles are a relatively new technology with various recent patents concerning the technology behind keeping a drone in the air, maintaining its stability, and controlling its motion manually or automatically. Additionally, high-performing network communications and smart wearable electronic devices are also relatively new technologies with various recent patents concerning the design of the technologies and the wearable devices themselves.

With advances in the technology of drones and other autonomous flying vehicles, network communications, and smart wearable devices, it is possible to conceive of a smart unmanned aerial vehicle which maintains a specified aerial position relative to a user or a group of users represented and identified by their corresponding one or more wearable (or otherwise portable) devices. Such an unmanned aerial vehicle may control aspects of related user comfort in an outdoor environment or a sufficiently large indoor environment (e.g. stadium, arena, mall). For example, the unmanned aerial vehicle may control aspects of user comfort relating to the local air temperature experienced by a user or a group of users.

Embodiments of the present invention are directed to a system for personalized temperature control utilizing an unmanned aerial vehicle in combination with a smart wearable device. Embodiments of the present invention provide for the combination of one or more smart wearable devices and advanced network communications to automatically control the position of an unmanned aerial vehicle and maintain an aerial position relative to an individual, or a group of individuals, represented by the one or more smart wearable devices. Furthermore, in embodiments of the present invention, the unmanned aerial vehicle may control aspects of local temperature and individual comfort by performing actions such as heating, cooling, and/or directing airflow.

Embodiments of the present invention will now be described in detail with reference to the accompanying Figures.

Figure 1:
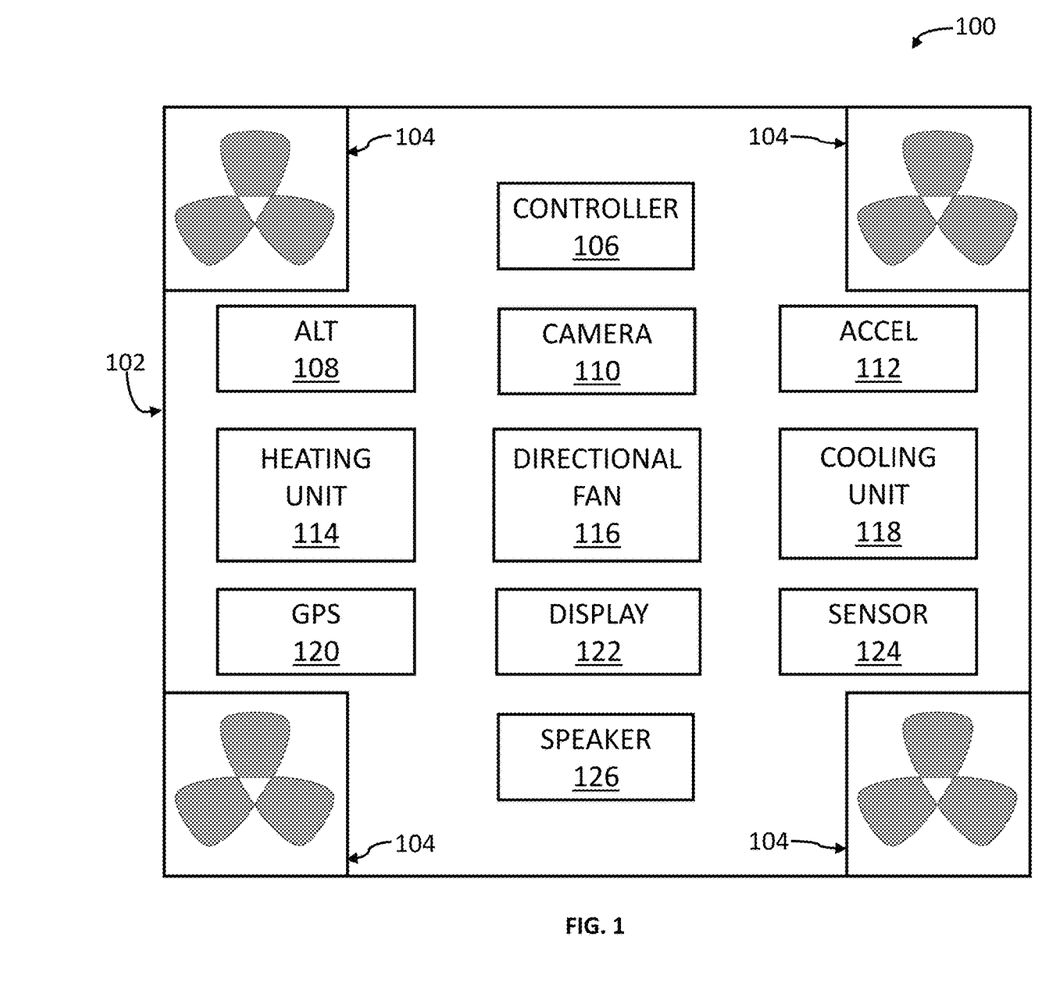
FIG. 1 is a block diagram illustrating an unmanned aerial vehicle (UAV), in accordance with an embodiment of the present invention.

Referring now to FIG. 1, an unmanned aerial vehicle (UAV) 100 is illustratively depicted, in accordance with an embodiment of the present invention. It should be understood by one of ordinary skill in the art that the UAV 100 may include a drone, a drone-like unit, or similarly functioning devices. As used herein, the term "drone" refers to an aerial vehicle capable of operating autonomously from a human operator to perform a predetermined function, such as control aspects of local temperature and individual comfort in an outdoor environment or a sufficiently large indoor environment. In an example embodiment, UAV 100 may include a housing unit 102 that supports at least one movement mechanism 104, and various components including a controller 106, an altimeter (ALT) 108, a camera 110, an accelerometer (ACCEL) 112, a heating unit 114, a directional fan 116, a cooling unit 118, a global positioning system (GPS) 120, a display 122, at least one sensor 124, and a speaker 126. It should be understood that one or more of the various components of UAV 100 may be affixed on the outside of the housing unit 102 or, alternatively, may be enclosed within the housing unit 102 of UAV 100. In an example embodiment, UAV 100 may also include other elements (not shown) or may omit some elements as shown, as readily contemplated by one of skill in the art.

In an example embodiment, UAV 100 may include at least one movement mechanism 104. It should be understood that the at least one movement mechanism 104 may include a single propeller, a plurality of propellers, a propulsion mechanism, or similarly functioning devices. The at least one movement mechanisms 104 may be configurable to provide both lift (vertical thrust) and lateral thrust (horizontal thrust). The vertical and horizontal components of the thrust allow the changing of the altitude, lateral movement, and orientation (attitude) of UAV 100. In an example embodiment, the at least one movement mechanism 104 may be powered by at least one motor (not shown) and a power supply (not shown) to provide movement for UAV 100. For example, the motor and the power supply may be mounted to UAV 100 to provide, via the at least one movement mechanisms 104, aerial movement (e.g. flying movement).

In an example embodiment, the at least one movement mechanisms 104 may be placed at any desired location on UAV 100 such that the placement of the at least one movement mechanisms 104 does not interfere with each other or with another component positioned on UAV 100. In an example embodiment, four of the at least one movement mechanisms 104 may be arranged about the periphery of the housing unit 102. In another embodiment, the at least one movement mechanisms 104 may be positioned on at least one extension arm (not shown) such that the at least one extension arm connects the at least one movement mechanisms 104 to the housing unit 102.

In an example embodiment, the at least one movement mechanisms 104 and/or motor (not shown) provides aerial movement for UAV 100 in multiple degrees of freedom. Multiple degrees of freedom generally refers to the ability for UAV 100 to move in a three-dimensional space. Specifically, the at least one movement mechanisms 104 and/or motor (not shown) may be controlled by controller 106, described below with reference to FIG. 2, to move UAV 100 along three perpendicular axes, namely forward/backward movement, up/down movement, and left/right movement. In addition, controller 106 may control the movement of UAV 100 in 360-degree rotation, tilting forward/backward movement (e.g., pitching), swiveling left/right movement (e.g., yawning), and pivoting side-to-side movement (e.g., rolling). In an example embodiment, the at least one movement mechanisms 104 and/or motor (not shown) provides movement for UAV 100 to, for example, travel to an individual or group of individuals identified by one or more wearable device 220, described below with reference to FIG. 3, maintain an aerial position relative the identified individual or group of individuals, and/or avoid contact with physical objects.

In an example embodiment, controller 106 may be configured to control aerial movement of UAV 100 by sending control signals to the at least one movement mechanisms 104. Controller 106 may include processors that are responsive to operation control methods embodied in application code. These methods may be embodied in computer instructions written to be executed by the processor, such as in the form of software. In an example embodiment, controller 106 may be coupled to transmit and receive signals from the at least one movement mechanisms 104 to determine and change their operational states (e.g., adjust lift from movement mechanism 104). Controller 106 may further be coupled to one or more components that enable controller 106 to, for example, determine the geographic position of UAV 100, orientation of UAV 100, altitude of UAV 100, and temperature-related user comfort action to be performed by UAV 100. In an example embodiment, these components may include sensor 124, altimeter (ALT) 108, camera 110, accelerometer (ACCEL) 112, heating unit 114, cooling unit 118, directional fan 116, global positioning system (GPS) 120, display 122, and speaker 126. Controller 106 will be further discussed below with regard to FIG. 2.

In an example embodiment, heating unit 114 may be a temperature control device configured to generate heat and/or warm air. Heating unit 114 may include small or micro sized heating elements such as, but not limited to, free radiating devices, thermoelectric devices, positive temperature coefficient (PTC) devices, polyimide heaters, and the like, now known in the industry or later developed. In other embodiments, heating unit 114 may utilize heat generated by a power supply (not shown) of UAV 100 to warm air. In an example embodiment, heating unit 114 may be coupled to and controlled by controller 106. For example, controller 106 may activate/deactivate heating unit 114 according to instructions/settings received, via network 210, from cloud server 240 and/or wearable device 220. As another example, controller 106 may activate/deactivate heating unit 114 in response to conditions detected by one or more input devices 320 and/or output devices 318.

In an example embodiment, cooling unit 118 may be a temperature control device configured to generate cool air. Cooling unit 118 may include a miniaturized vapor-compression refrigeration devices, peltier elements, thermoelectric cooling devices, and the like now known in the industry or later developed. In an example embodiment, cooling unit 118 may be coupled to and controlled by controller 106. For example, controller 106 may activate/deactivate cooling unit 118 according to instructions/settings received, via network 210, from cloud server 240 and/or wearable device 220. As another example, controller 106 may activate/deactivate cooling unit 118 in response to conditions detected by one or more input devices 320 and/or output devices 318.

In an example embodiment, directional fan 116 may be configured to control directionality of warm air and/or cool air generated by heating unit 114 and cooling unit 118, respectively. Directional fan 116 may include a single and/or multi-directional fan or an air funneling system. In an embodiment, directional fan 116 may be centrally located within housing unit 102 of UAV 100. In an example embodiment, directional fan 116 may direct warm air, generated by heating unit 114, or cool air, generated by cooling unit 118, in the direction of an individual or group of individuals identified by one or more wearable device 220.

In an example embodiment, camera 110 may be configured to provide visual feedback to UAV 100, via controller 106, such as still images and/or video feedback. For example, camera 110 may be configured to detect moving objects (e.g., movement of an individual, or a group of individuals, represented by the one or more smart wearable devices), and stationary objects (e.g., trees, buildings, other structures). In an example embodiment, camera 110 may be configured to provide visual feedback of obstacles in the path of UAV 100 for any purpose such as, but not limited to, providing collision avoidance and navigation guidance to UAV 100. It should be understood that various types of cameras, including night vision enabled cameras, infrared sensing cameras, etc., are within the scope of the present invention.

In an example embodiment, UAV 100 may include at least one sensor 124. Sensor 124 may include, but is not limited to, an acoustic sensor (e.g., a microphone), a chemical sensor, an infrared sensor, an optical sensor, a collision avoidance sensor (e.g., a proximity sensor), a temperature sensor, etc. In an embodiment, sensor 124 may be configured to detect sounds made by an individual, or a group of individuals, represented by the one or more smart wearable devices (e.g., wearable device 220). In another embodiment, sensor 124 may be configured to detect proximity to objects and/or obstacles in the path of UAV 100 for any purpose such as, but not limited to, providing navigation input to UAV 100. In yet another embodiment, sensor 124 may be configured to detect the temperature in an area in close proximity to UAV 100 and/or of an individual, or a group of individuals, represented by the one or more wearable device 220.

In an example embodiment, UAV 100 may include a speaker 126. Speaker 126 may be configured to provide audio feedback. For example, speaker 126 may provide audio alerts (e.g., operational status, warnings) to an individual, or a group of individuals, represented by the one or more smart wearable devices (e.g., wearable device 220). It should be understood that various types of speakers, including loudspeakers, transducers, and any other device capable of converting an electrical audio signal into a corresponding sound, are within the scope of the present invention.

Figure 2:
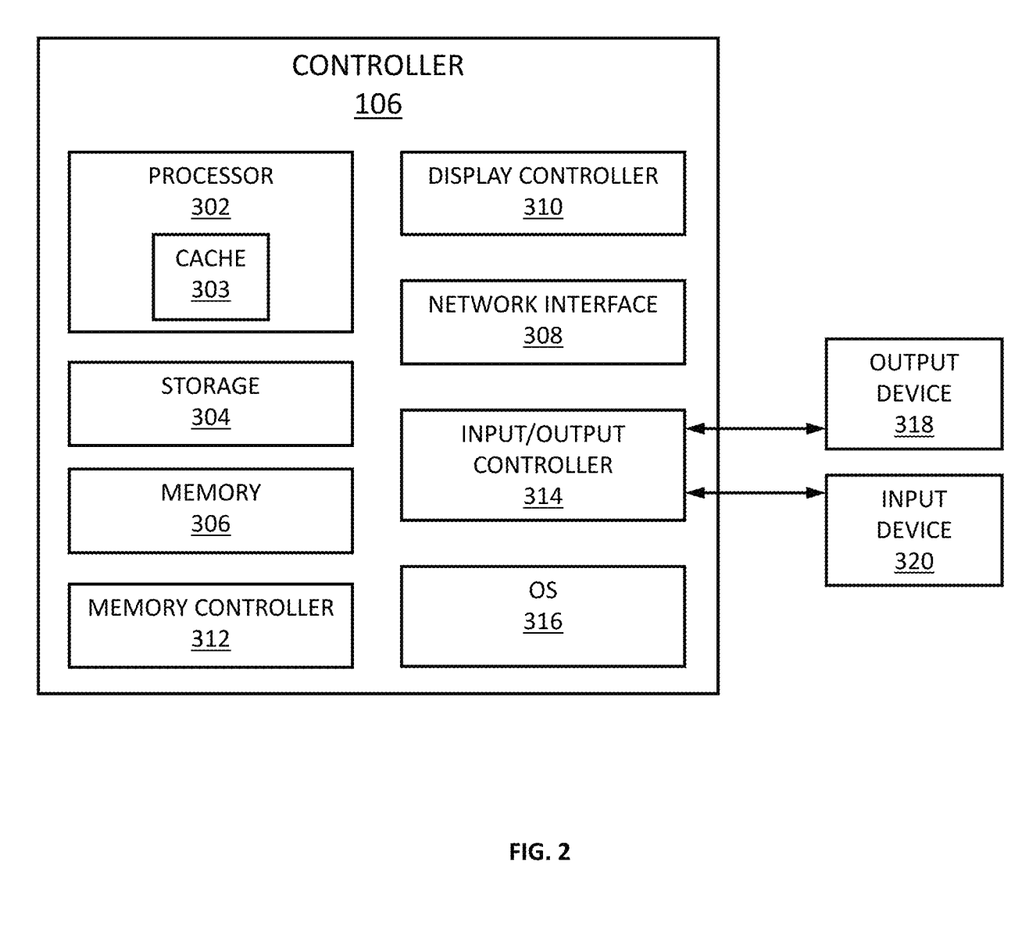
FIG. 2 is a block diagram illustrating the controller of FIG. 1, in accordance with an embodiment of the present invention.

FIG. 2 illustrates a block diagram of a controller 106 for use in implementing a system or method according to some embodiments of the present invention. The systems and methods described herein may be implemented in hardware, software, or a combination thereof. In some embodiments, the methods described may be implemented, at least in part, in hardware and may be part of the microprocessor of a special (e.g., system on chip, single-board computer) or general-purpose controller 106, such as a single-board computer, a personal computer, workstation, minicomputer, or mainframe computer.

In an example embodiment, as shown in FIG. 2, controller 106 may include a processor 302, storage 304, memory 306 coupled to a memory controller 312, and one or more input devices 320 and/or output devices 318, such a peripheral or control devices, that are communicatively coupled via a local input/output controller 314. These devices 318 and 320 may include, for example, battery sensors, position sensors (e.g., altimeter 108, accelerometer 112, GPS 120), one or more other sensors (e.g., sensor 124), a camera (e.g., camera 110), a speaker (e.g., speaker 126), indicator/identification lights, and the like. Input devices such as a conventional keyboard (not shown) and mouse (not shown) may be coupled to input/output controller 314 when the UAV is docked to allow personnel to service or input information. Input/output controller 314 may include, for example, one or more buses or other wired or wireless connections, as known in the art. Input/output controller 314 may include additional elements, which are omitted for simplicity, such as controllers, buffers (caches), drivers, repeaters, and receivers, to enable communications.

In an example embodiment, output device 318 and input device 320 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

In an example embodiment, processor 302 is a hardware device for executing hardware instructions or software which may be stored in memory 306. Processor 302 may include a custom made or commercially available processor, system on chip, a central processing unit (CPU), an auxiliary processor among several processors associated with processor 302, a semiconductor-based microprocessor (in the form of a microchip or chipset), a microprocessor, or other device for executing instructions. In an example embodiment, processor 302 may include cache 303 which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache 303 may be organized as a hierarchy of more cache levels (e.g., L1, L2).

In an example embodiment, memory 306 may include one or more combinations of volatile memory elements (e.g., random access memory (RAM), such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, memory 306 may incorporate electronic, magnetic, optical, or other types of storage media. Note that the memory 306 may have a distributed architecture, where various components are situated remote from one another but may be accessed by processor 302.

The instructions in memory 306 may include one or more separate programs, each of which comprises an ordered listing of executable instructions for implementing logical functions. In the example of FIG. 2, the instructions in memory 306 may include a suitable operating system (OS) 316. The operating system 316 essentially may control the execution of other computer programs and provides scheduling, input-output control, file and data management, memory management, and communication control and related services.

Additional data, including, for example, instructions for processor 302 or other retrievable information, may be stored in storage 304, which may be a storage device such as a hard disk drive or solid-state drive. The stored instructions in memory 306 or in storage 304 may include those enabling processor 302 to execute one or more aspects of the systems and methods of this disclosure.

In an example embodiment, controller 106 may further include a display controller 310 coupled to display 122. In some embodiments, display 122 may be an LCD screen. In other embodiments, display 122 may include a plurality of LED status lights. In an example embodiment, controller 106 may further include a network interface 308 for coupling to network 210 of FIG. 3. Network interface 308 may be configured to facilitate, via network 210 and cloud server 240, communications between controller 106 and/or wearable device 220. In other embodiments, network interface 308 may be configured to transmit data between controller 106 and wearable device 220, via network 210. The network 210 may be an IP-based network for communication between controller 106, a server (e.g., cloud server 240 of FIG. 3), and a smart device (e.g., wearable device 220 of FIG. 3) via a broadband connection. In an embodiment, the network 210 may be a satellite network. Network 210 may transmit and receive data between controller 106 and external systems. In an embodiment, the external system may be another UAV or a UAV docking system, wherein the transmitting and receiving of data allows controller 106 to identify the other UAV or docking system. In some embodiments, network 210 may be a managed IP network administered by a service provider. Network 210 may be implemented in a wireless fashion, e.g., using wireless protocols and technologies, such as WiFi, WiMax, satellite, Bluetooth, or a combination thereof. Network 210 may also be a packet-switched network such as a local area network, wide area network, metropolitan area network, the Internet, or other similar type of network environment. Network 210 may be a fixed wireless network, a wireless local area network (LAN), a wireless wide area network (WAN) a personal area network (PAN), a virtual private network (VPN), intranet or other suitable network system (e.g., Bluetooth) and may include equipment for receiving and transmitting signals. In general, network 210 can be any combination of connections and protocols that will support communications between wearable device 220, UAV 100, and cloud server 240.

Systems and methods according to this disclosure may be embodied, in whole or in part, in computer program products or in controller 106, such as that illustrated in FIG. 2.

Figure 3:
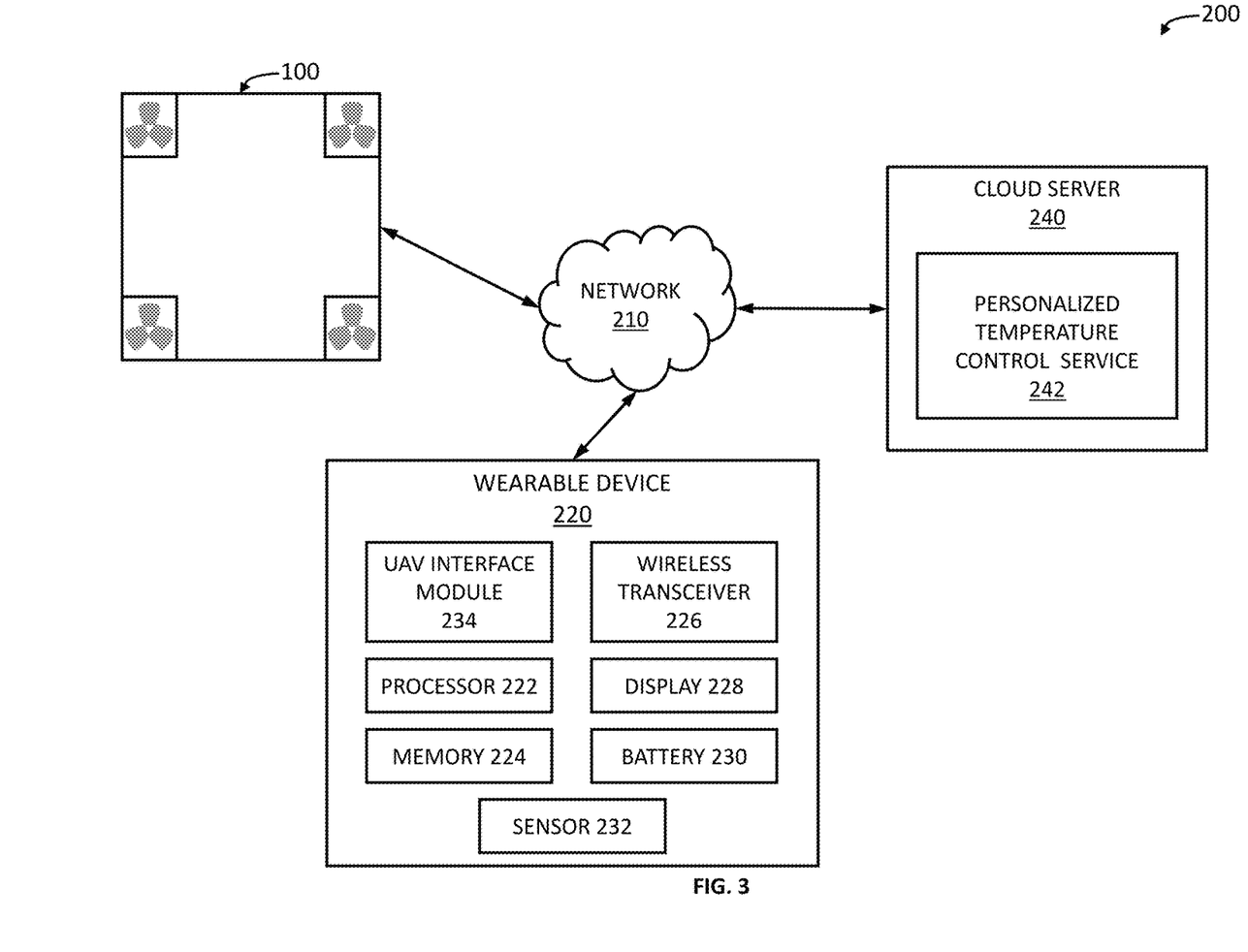
FIG. 3 is a block diagram illustrating a personalized temperature control (OPTC) system utilizing the UAV of FIG. 1, in accordance with an embodiment of the present invention.

Referring now to FIG. 3, an embodiment is shown of personalized temperature control (OPTC) system 200 utilizing the UAV of FIG. 1 and operable to control aspects of local temperature and comfort for an individual, or a group of individuals, represented by one or more smart wearable devices (e.g., wearable device 220). In an example embodiment, OPTC system 200 may include UAV 100, wearable device 220, and cloud server 240, all interconnected via network 210.

In an example embodiment, wearable device 220 may include processor 222, memory 224, wireless transceiver 226, display 228, battery 230, one or more sensor 232, and UAV interface module 234. Wearable device 220 may also include other elements (not shown) or may omit some elements as shown, as readily contemplated by one of skill in the art. In an example embodiment, wearable device 220 may be a wearable computing device such as, but not limited to, a wristband or smart watch. In other embodiments, wearable device 220 may be smart phone or any suitable form factor and still fall within the described embodiments While shown in several embodiments herein as comprising a standalone computing device, in various embodiments, wearable device 220 may be connected as a peripheral to a mobile computing device such as a smartphone, tablet, and/or computer to provide additional functionality and user interface mechanisms. In an example embodiment, wearable device 220 may be operative to transmit/receive data to/from UAV 100 and control parameters which govern actions of UAV 100. Such parameters may include: a specific or range of horizontal/lateral and vertical distances relative to wearable device 220; target heating or cooling temperature; measure of heating/cooling strength; and directionality of heating/cooling air flow.

In an example embodiment, sensor 232 may include one or more temperature sensors, moisture sensors, chemical sensors, pressure sensors, force sensors, heat sensors, infrared sensors, accelerometers, gyroscopes, a compass and/or a Global Positioning System (GPS) module. Sensor 232 may include any combination of sensors suitable for use in wearable device 220 and still fall within the described embodiments as one skilled in the art would readily understand. Sensor 232 may be operative to provide information such as, but not limited to, geographical location of an individual represented by wearable device 220, current body/skin temperature of an individual in contact with wearable device 220, and quantitative/qualitative attributes concerning the physical condition of an individual represented by wearable device 220 (e.g., whether the individual is shivering, has goosebumps, is sweating). Monitoring, by sensor 232, of the physical condition of an individual represented by wearable device 220 may be constant or periodic. Consequently, sensor 232 may, for example, detect increasing/decreasing temperature of an individual represented by wearable device 220.

In an example embodiment, wearable device 220 may include processor 222. Processor 222 may be any of various commercially available processors. Wearable device 220 may also include memory 224. Memory 224 may store, among other types of information, information obtained from sensor 232. Memory 224 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In an example embodiment, processor 222 may be communicatively coupled to wireless transceiver 226, sensor 232, UAV interface module 234, and memory 224. Memory 224 may store data arranged for execution by processor 222 to enable temperature-related user comfort actions by UAV 100.

In an example embodiment, wearable device 220 may include display 228. Display 228 may include any digital display device suitable for wearable device 220. For instance, display 228 may be implemented by a liquid crystal display (LCD) such as a touch-sensitive, color, thin-film transistor (TFT) LCD, a plasma display, a light emitting diode (LED) display, an organic light emitting diode (OLED) display, a cathode ray tube (CRT) display, or other type of suitable visual interface for displaying content to a user of the wearable device 220. Display 228 may further include some form of a backlight or brightness emitter as desired for a given implementation. In various embodiments, display 228 may include touch-sensitive or touchscreen displays. A touchscreen may include an electronic visual display that is operative to detect the presence and location of a touch within the display area or touch interface. In some embodiments, the display may be sensitive or responsive to touching of the display of the device with a finger or hand. In other embodiments, the display may be operative to sense other passive objects, such as a stylus or electronic pen.

In an example embodiment, wireless transceiver 226 may include or implement various communication techniques to allow wearable device 220 to communicate with any number and type of other electronic devices. For example, wireless transceiver 226 may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. Wireless transceiver 226 may include a radio designed to communicate information over a wireless personal area network (WPAN) or a wireless local area network (WLAN). Wireless transceiver 226 may be arranged to provide data communications functionality in accordance with different types of lower range wireless network systems or protocols. Examples of suitable WPAN systems offering lower range data communication services may include a Bluetooth system, an infra-red (IR) system, an Institute of Electrical and Electronics Engineers (IEEE) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

Although not shown, wearable device 220 may further include one or more device resources commonly implemented for electronic devices, such as various computing and communications platform hardware and software components typically implemented by a personal electronic device. Some examples of device resources may include, without limitation, a co-processor, a graphics processing unit (GPU), a chipset/platform control hub (PCH), an input/output (I/O) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth.

In an example embodiment, UAV interface module 234 may be a program, or subroutine contained in a program, that may operate to collect data obtained from sensor 232 for transmission, via wireless transceiver 226 and network 210, to cloud server 240. Examples of collected data may include user geographical location, user body/skin temperature(s), and other quantitative/qualitative user attributes. In an example embodiment, UAV interface module 234 may also operate to communicate settings input from a user of wearable device 220 to cloud server 240, via wireless transceiver 226 and network 210. Examples of user settings may include settings relating to requisition of UAV 100, settings relating to flight navigation of UAV 100, and settings relating to temperature-related user comfort actions to be taken by UAV 100. Examples of user settings may further include distance parameters for UAV 100 such as horizontal and vertical distances to maintain relative to the user represented by wearable device 220. Furthermore, user settings may include temperature-related parameters such as target heating or cooling temperatures, specified temperature ranges, specified threshold temperatures, and/or directionality of air flow.

In an alternative embodiment, UAV interface module 234 may utilize processor 222 to process data obtained from sensor 232 and instructions/settings provided by the user of wearable device 220 in order to determine an action(s) (e.g., requisition, discontinuation of use, a temperature-related action, a flight-related action) to be taken by UAV 100. In this embodiment, UAV interface module 234 may communicate such action(s) directly to UAV 100, via wireless transceiver 226 and network 210. For example, positioning of UAV 100 may be based on a fixed altitude and fixed distance as specified by the user of wearable device 220 via UAV interface module 234. Furthermore, in an alternative embodiment, UAV interface module 234 may receive, via wireless transceiver 226 and network 210, status alerts (e.g., power level, air flow status, heating/cooling operation, etc.) from UAV 100 for display to the user via display 228.

In an example embodiment, cloud server 240 may include personalized temperature control service (PTCS) 242. Cloud server 240 may be a desktop computer, a notebook, a laptop computer, a blade server, a networked computer appliance, a virtual device, or any other networked electronic device or computing system capable of sending and receiving data to and from other computing devices such as wearable device 220 and UAV 100, via network 210, and capable of supporting the functionality required of embodiments of the invention. In an example embodiment, cloud server 240 may function to process data received, via network 210, from wearable device 220 and/or UAV 100. Furthermore, in an example embodiment, cloud sever 240 may operate to transmit communications (e.g., instructions, commands, alerts) to UAV 100 and/or wearable device 220. While cloud server 240 is shown as a single device, in other embodiments, cloud server 240 may be comprised of a cluster or plurality of computing devices, working together or working separately. Cloud server 240 may be described generally with respect to FIG. 5 below.

In an example embodiment, personalized temperature control service 242 may be a program, or subroutine contained in a program, that may operate to determine one or more actions for UAV 100 to execute based on data received from UAV 100 and wearable device 220, via network 210. PTCS 242 may also operate to send and receive data to and from other computing devices such as data UAV 100 and wearable device 220, via network 210. In an example scenario, PTCS 242 may receive data from wearable device 220 (e.g., data obtained by sensor 232, user instructions/settings input via UAV interface module 234), process the received data and determine action(s)/instruction(s) for UAV 100. PTCS 242 may then transmit, via network 210, any determined action(s)/instruction(s) to UAV 100 for execution. In an example embodiment, PTCS 242 may operate to allow for dynamically adjusted action(s)/instruction(s) for UAV 100 based on updated data received from UAV 100 and/or updated data received from wearable device 220 resulting from continuous or periodic monitoring by sensor 232.

In another example scenario, PTCS 242 may receive data from UAV 100 (e.g., power level, air flow status, heating/cooling operation, etc.), process the received data and transmit, via network 210, indications of UAV 100 status/behavior and/or alerts to wearable device 220 for display to the user via display 228. For instance, PTCS 242 may periodically monitor power levels of UAV 100. In response to determined low power levels for UAV 100, PTCS 242 may, in one course of action, alert the user of wearable device 220 of UAV 100's low power status and prompt the user to instruct UAV 100 to return to a docking station (if sufficient power remains) or to land safely near the user. PTCS 242 may also, in another course of action, instruct UAV 100 to return to a docking station (if sufficient power remains) or to land safely near the user and simply notify the user of this course of action. In this course of action, PTCS 242 may also requisition a replacement UAV for the user of wearable device 220. In situations where PTCS 242 has instructed UAV 100 and notified the user of wearable device 220, the user of wearable device may have the option to override instructions from PTCS 242. In another instance, where PTCS 242 transmits indications/explanations of behavior by UAV 100 to the user of wearable device 220, the user may have the option of overriding the behavior or UAV 100.

Furthermore, in an example embodiment, PTCS 242 may consider information which does not originate from either UAV 100 or wearable device 220 but is otherwise available via the internet and/or another computing device. Such information may include current and forecasted environmental conditions (e.g., ambient air temperature, wind speed, humidity, inclement weather, etc.) in the vicinity of the user. PTCS 242 may process this information concurrently, and/or separately, with the processing of information received from UAV 100 and wearable device 220 to determine one or more actions for execution by UAV 100. Moreover, PTCS 242 may transmit alerts, via network 210, to wearable device 220 based on information which does not originate from either UAV 100 or wearable device 220. Such alerts may be displayed to the user via display 228. For example, in response to information, obtained via the internet, concerning forecasted inclement weather in the vicinity of wearable device 220, PTCS 242 may send an alert to wearable device 220 advising the user to discontinue use of UAV 100 and/or seek shelter.

While PTCS 242 is shown as being located within cloud server 240, in other embodiments, the operations of PTCS 242 may be located within wearable device 220. The operations and functions of PTCS 242 are described in further detail below with regard to FIG. 4.

Figure 4:
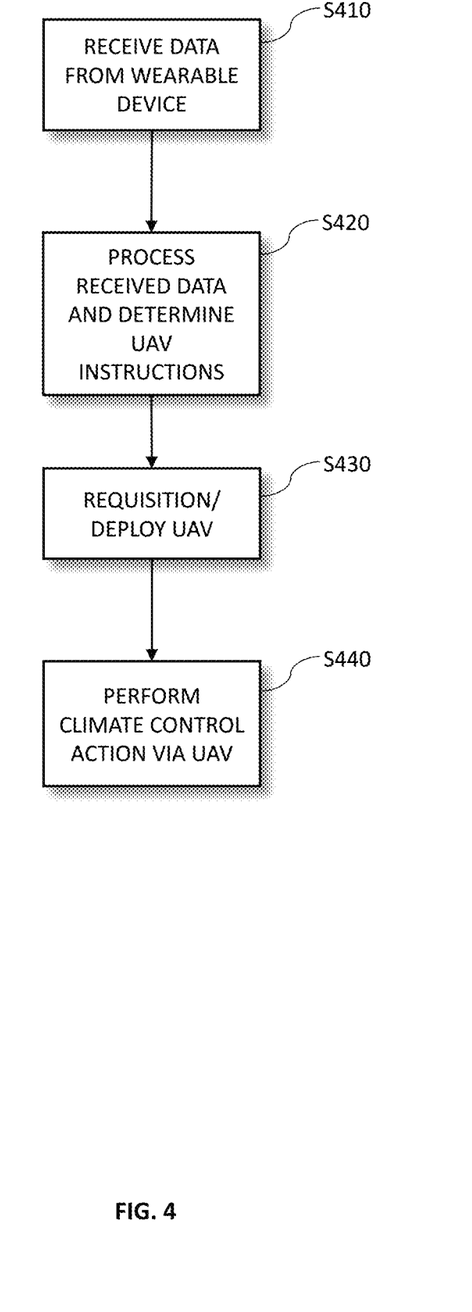
FIG. 4 is a flowchart illustrating the operations of the personalized temperature control system of FIG. 3, in accordance with an embodiment of the invention.

FIG. 4 shows a flowchart illustrating the operations of PTCS 242 in accordance with an example embodiment of the invention. Referring to step S410, PTCS 242 may receive, via network 210, data originating from wearable device 220. In an embodiment, the data may include one or more of the following elements: the geographic location of an individual/user, or a group of individuals/users, represented by the geographic location of the one or more wearable device 220; the current body/skin temperature of an individual, or a group of individuals, in contact with the one or more wearable device 220; instructions and/or settings provided by an individual, or a group of individuals, represented by the one or more wearable device 220; and other quantitative and qualitative attributes relating to the physical condition of an individual, or a group of individuals, represented by the one or more wearable device 220, such as whether (and how much) a user is shivering, has goosebumps, is sweating, etc. In an example embodiment, PTCS 242 receives, via network 210, data from wearable device 220. The received data includes a requisition for UAV 100, parameters for UAV 100 to maintain a half meter lateral distance and a half meter vertical distance relative to the user of wearable device 220, and parameters for UAV 100 to direct air, warmed to 72 degrees Fahrenheit, at the user. In an embodiment of the present invention, UAV 100 may be requisitioned from a designated take-off/landing site for one or more UAV 100. In another embodiment of the present invention, UAV 100 may be requisitioned from the residence of the user. In an embodiment of the present invention, the received geographic location my include a mean geographic location of a set individuals in a local area and UAV 100 may be instructed to perform temperature-related actions directed to the mean geographic location. In an alternative embodiment, data received from wearable device 220 may be used to requisition and provide settings for more than one UAV 100.

Referring to step S420, PTCS 242 may process the data received in step S410 in order to determine instructions for UAV 100 which are in accordance with parameters of the received data. In an example embodiment, PTCS 242 may process the data received in step S410 to create instructions to requisition UAV 100 and instructions for UAV 100 to maintain a half meter lateral distance and a half meter vertical distance relative to the user of wearable device 220. Furthermore, PTCS 242 may process the data received in step S410 to create instructions for UAV 100 to direct air, warmed to 72 degrees Fahrenheit, at the user of wearable device 220. In an alternative embodiment, instructions may be determined for more than one UAV 100.

Referring to step S430, PTCS 242 may, in response to instructions determined in step S420, transmit instructions to requisition UAV 100. Furthermore, PTCS 242 may transmit instructions, determined in step S420, to UAV 100 for deployment to the user of wearable device 220. As part of the deployment, PTCS 242 may calculate the absolute location of both UAV 100 and wearable device 220. In an embodiment, PTCS 242 may also transmit instructions to UAV 100 for collision avoidance, whereby UAV 100 may sense and avoid collisions with other objects in the physical world including the user of wearable device 220, other individuals, and other inanimate or animate objects such as walls, street signs, vehicles, other UAVs, etc. In an alternative embodiment, instructions determined in step S420 may be transmitted to more than one UAV 100.

Referring to step S440, PTCS 242 may transmit, via network 210, instructions, determined in step 420, causing UAV 100 to engage in a temperature-related user comfort action (e.g., directing heated air, directing cooled air, or directing airflow). In an example embodiment, PTCS 242 may transmit instructions to UAV 100 which cause UAV 100 to direct air, warmed to 72 degrees Fahrenheit, at the user of wearable device 220. The transmitted instructions may have been determined in step S420 and may be in accordance with elements of the data received in step S410.

Figure 5:
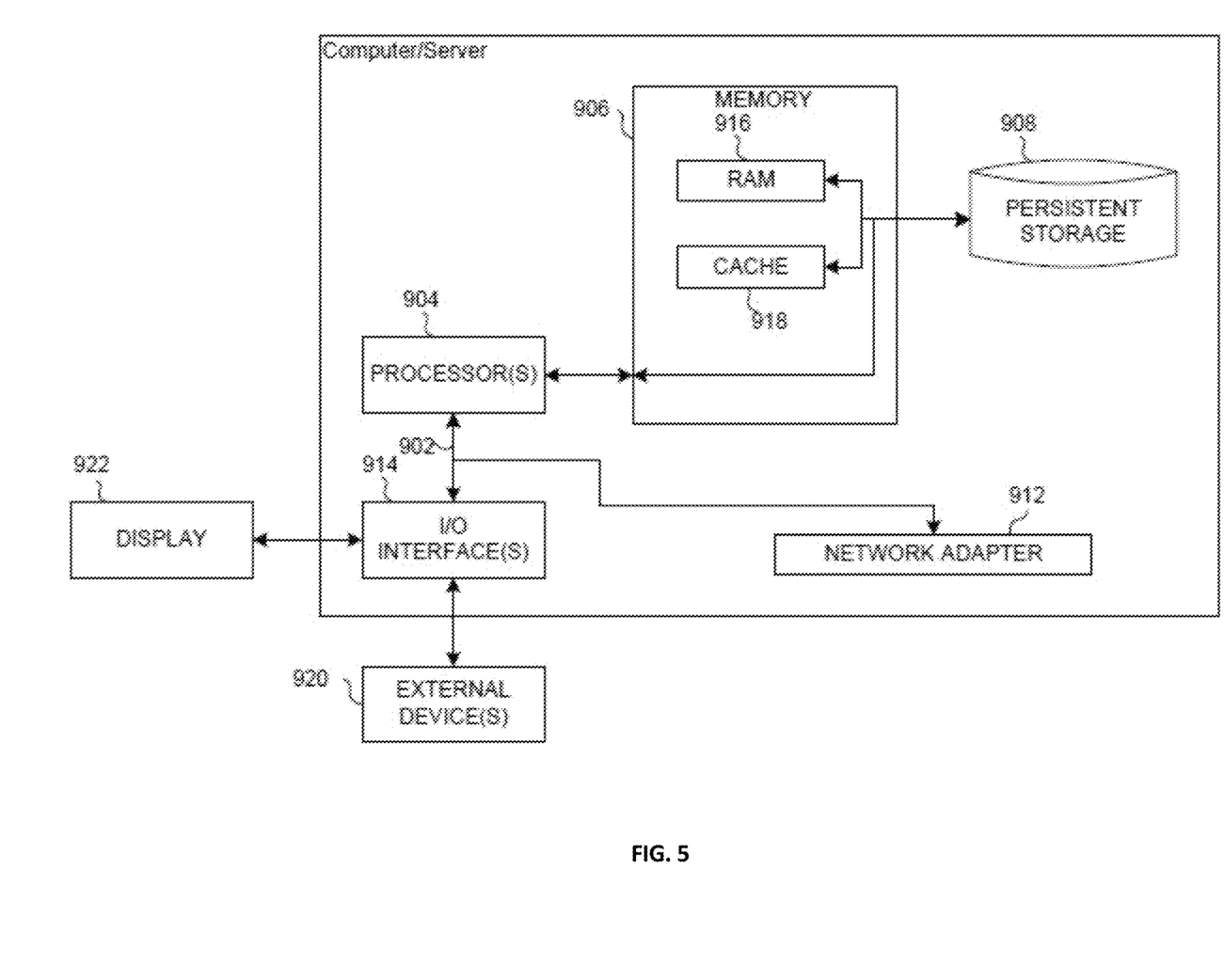
FIG. 5 is a block diagram depicting hardware components of the personalized temperature control system of FIG. 3, in accordance with an embodiment of the invention.

FIG. 5 depicts a block diagram of components of wearable device 220 and cloud server 240, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Wearable device 220 and cloud server 240 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs UAV interface module 234, in wearable device 220, and personalized temperature control service, in cloud server 240, are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs UAV interface module 234, in wearable device 220, and personalized temperature control service, in cloud server 240, may be downloaded to persistent storage 908 through network adapter 912.

I/O interface(s) 914 allows for input and output of data with other devices that may be connected to wearable device 220 and cloud server 240. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs UAV interface module 234, in wearable device 220, and personalized temperature control service, in cloud server 240, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be appreciated that the use of any of the following "/", "and/or", and "at least one of", for example, in the cases of "A/B", "A and/or B", and "at least of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and the third listed options (A and C) only, or the selection of the second and the third listed options (B and C) only, or the selection of all three listed options (A, B, and C). This may be extended as readily apparent by one of ordinary skill in this and related arts, for as many items listed.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
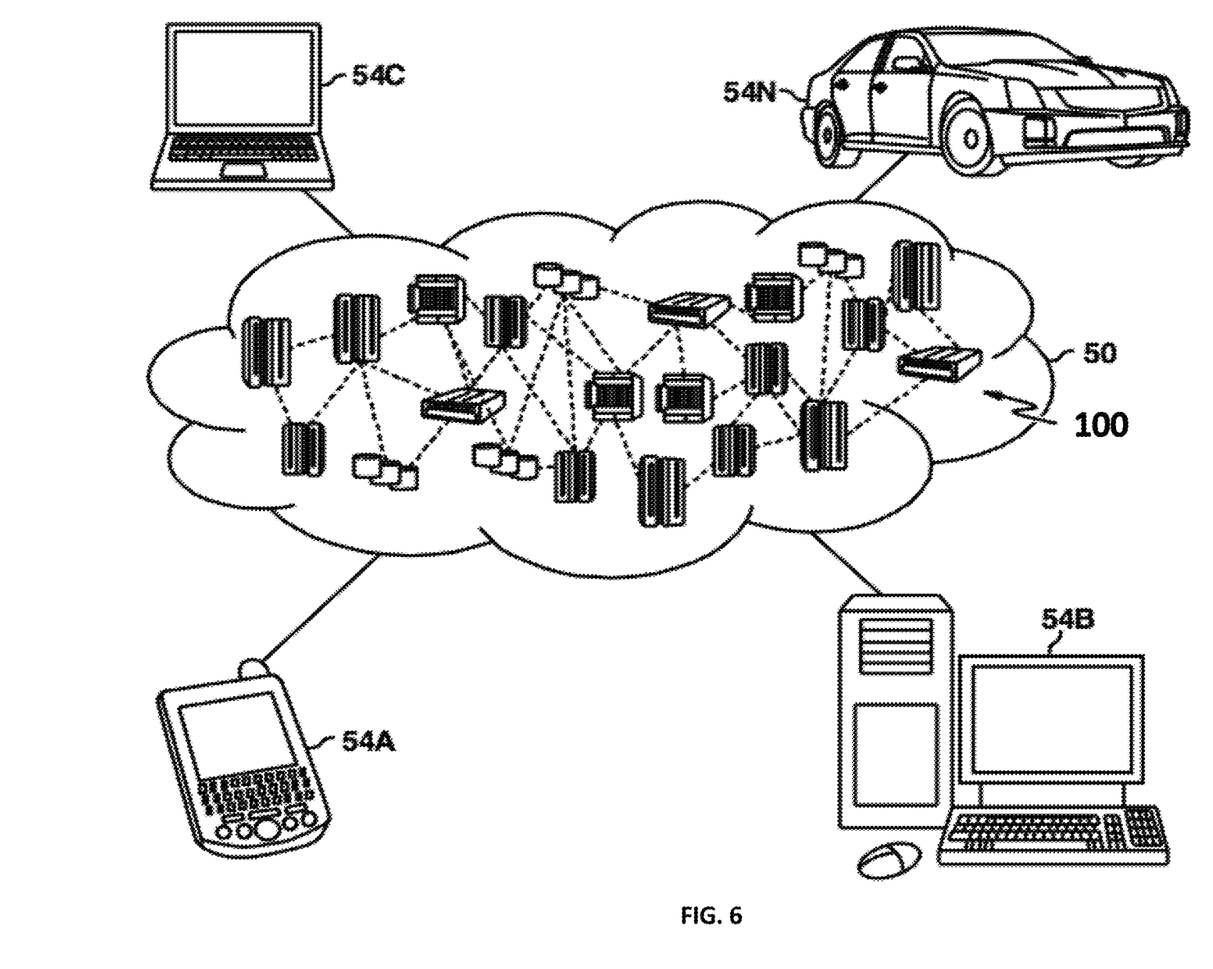
FIG. 6 depicts a cloud computing environment in accordance with an embodiment of the present invention.

Referring now to FIG. 6, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
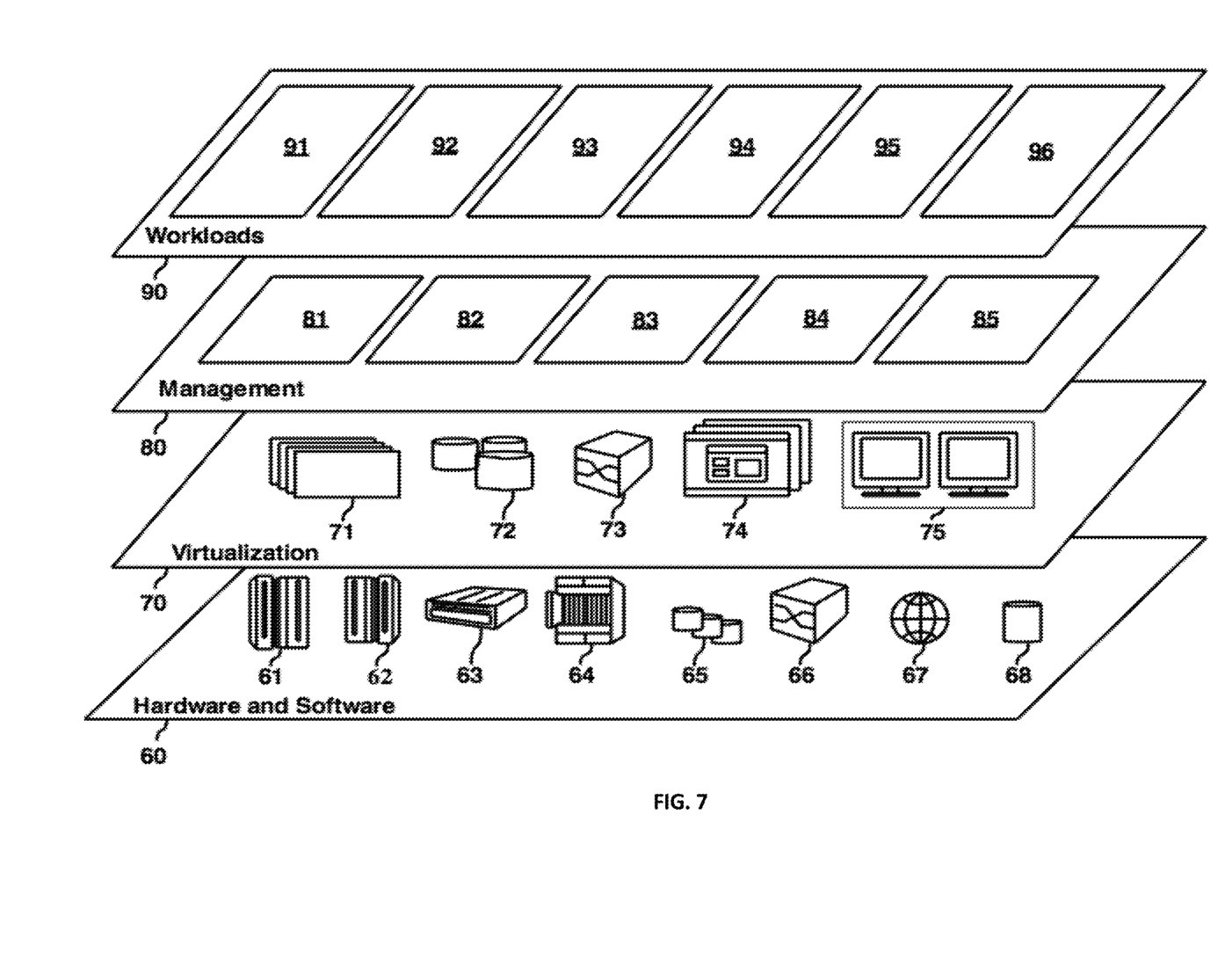
FIG. 7 depicts abstraction model layers in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized temperature control system 96. Personalized temperature control system 96 may relate to a system for personalized temperature control utilizing an unmanned aerial vehicle in combination with a smart wearable device.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A processor-implemented method for temperature control, the method comprising:

performing, by at least one unmanned aerial vehicle, at least one local climate control action at a location based on data received from a wearable computing device of at least one individual, wherein the data comprises a current body temperature of the at least one individual in contact with the wearable computing device, and wherein the wearable computing device comprises any one or combination of a temperature sensor, a moisture sensor, a chemical sensor, a biometric sensor, and a thermal sensor, and wherein the location is a mean geographic location of a set of individuals in a local area, the local area including at least two wearable computing devices in contact with at least two individuals, and wherein the at least one unmanned aerial vehicle detects a temperature of the local area via a sensor, and wherein current and forecasted weather conditions of the local area are displayed to the at least two individuals via respective displays of the at least two wearable computing devices, and wherein in response to forecasted inclement weather conditions for the local area, an alert is displayed to the at least two individuals, via the respective displays of the at least two wearable computing devices, which advises the at least two individuals to discontinue use of the at least one unmanned aerial vehicle and seek shelter, and wherein status alerts of the at least one unmanned aerial vehicle are displayed to the at least two individuals via the respective displays of the at least two wearable computing devices.

2. The processor-implemented method of claim 1, further comprising:
determining the location and at least one quantitative attribute of the at least one individual based on the data;
determining at least one instruction for the at least one unmanned aerial vehicle based on the at least one quantitative attribute; and
communicating the at least one instruction to the at least one unmanned aerial vehicle.

3. The processor-implemented method of claim 2, wherein the at least one instruction for the at least one unmanned aerial vehicle comprises an instruction to deploy the at least one unmanned aerial vehicle to the location.

4. The processor-implemented method of claim 1, wherein the data is provided to the wearable computing device by the at least one individual, and wherein the at least one individual is a user of the wearable computing device.

5. The processor-implemented method of claim 1, wherein the data comprises geographical location of the at least one individual, current body temperature of the at least one individual, settings of the at least one individual, and other attributes relating to physical condition of the at least one individual.

6. The processor-implemented method of claim 5, wherein the settings specify an element from the group consisting of settings relating to requisition of the at least one unmanned aerial vehicle, settings relating to flight navigation of the at least one unmanned aerial vehicle, settings relating to temperature-related actions to be taken by the at least one unmanned aerial vehicle, settings relating to horizontal and vertical distance parameters for the at least one unmanned aerial vehicle relative to the at least one individual, settings relating to temperature-related parameters, and settings relating to directionality of air flow.

7. The processor-implemented method of claim 1, wherein the at least one unmanned aerial vehicle comprises a heating unit, a cooling unit, and a directional fan.

8. The processor-implemented method of claim 1, wherein the at least one local climate control action comprises a temperature-related user comfort action selected from the group consisting of directing heated air, directing cooled air, and directing airflow.

9. An unmanned aerial vehicle for performing personalized temperature control in combination with a wearable computing device, the unmanned aerial vehicle comprising:
a housing unit;
at least one movement mechanism coupled to the housing unit to provide aerial movement;
a heating unit;
a cooling unit;
a directional fan;
a chemical sensor; and
a controller operatively coupled to the at least one movement mechanism, the heating unit, the cooling unit, and the directional fan, wherein the controller comprises a processor that is responsive to executable computer instructions to control the at least one movement mechanism, the heating unit, the cooling unit, the directional fan, and to perform at least one temperature-related action, and wherein the executable computer instructions are determined based on data received from the wearable computing device, and wherein the data comprises a current body temperature of at least one individual in contact with the wearable computing device,
and wherein the location is a mean geographic location of a set of individuals in a local area, the local area including at least two wearable computing devices in contact with at least two individuals, and wherein the unmanned aerial vehicle detects a temperature of the local area via a sensor, and wherein current and forecasted weather conditions of the local area are displayed to the at least two individuals via respective displays of the at least two wearable computing devices, and wherein in response to forecasted inclement weather conditions for the local area, an alert is displayed to the at least two individuals, via the respective displays of the at least two wearable computing devices, which advises the at least two individuals to discontinue use of the unmanned aerial vehicle and seek shelter, and wherein status alerts of the unmanned aerial vehicle are displayed to the at least two individuals via the respective displays of the at least two wearable computing devices.

10. The unmanned aerial vehicle of claim 9, wherein the controller determines at least one of a geographic position of the unmanned aerial vehicle, orientation of the unmanned aerial vehicle, altitude of the unmanned aerial vehicle, and the at least one temperature-related user comfort action to be performed by the unmanned aerial vehicle.

11. The unmanned aerial vehicle of claim 9, wherein the at least one temperature-related user comfort action is selected from the group consisting of directing heated air, directing cooled air, and directing airflow.

12. The unmanned aerial vehicle of claim 9, further comprising:
an altimeter;
a camera;
an accelerometer;
a global positioning system;
a display;
a sensor; and
a speaker.

13. The unmanned aerial vehicle of claim 12, wherein the sensor of the unmanned aerial vehicle may be operatively coupled to the controller, and wherein the sensor comprising any one or combination of an acoustic sensor, a chemical sensor, an infrared sensor, an optical sensor, a proximity sensor, and a temperature sensor.

14. The unmanned aerial vehicle of claim 9, wherein the wearable computing device comprises a processor, a memory, a display, a wireless transceiver, and a sensor.

15. The unmanned aerial vehicle of claim 14, wherein the sensor of the wearable computing device comprising any one or combination of a temperature sensor, a moisture sensor, a chemical sensor, a pressure sensor, a force sensor, a heat sensor, an infrared sensor, an accelerometer, a gyroscope, a compass, and a global positioning system.

16. The unmanned aerial vehicle of claim 9, wherein the data is provided to the wearable computing device by at least one individual, and wherein the at least one individual is a user of the wearable computing device.

17. The unmanned aerial vehicle of claim 16, wherein the data comprises geographical location of the at least one individual, current body temperature of the at least one individual, settings of the at least one individual, and other attributes relating to physical condition of the at least one individual.

18. A computer program product for temperature control, the computer program product comprising:
   one or more computer-readable tangible storage devices and program instructions stored on at least one of the one or more computer-readable tangible storage devices, the program instructions comprising:
      program instructions to perform, by at least one unmanned aerial vehicle, at least one local climate control action at a location based on data received from a wearable computing device of at least one individual, wherein the data comprises a current body temperature of the at least one individual in contact with the wearable computing device, and wherein the wearable computing device comprises any one or combination of a temperature sensor, a moisture sensor, a chemical sensor, a biometric sensor, and a thermal sensor,
   and wherein the location is a mean geographic location of a set of individuals in a local area, the local area including at least two wearable computing devices in contact with at least two individuals, and wherein the at least one unmanned aerial vehicle detects a temperature of the local area via a sensor, and wherein current and forecasted weather conditions of the local area are displayed to the at least two individuals via respective displays of the at least two wearable computing devices, and wherein in response to forecasted inclement weather conditions for the local area, an alert is displayed to the at least two individuals, via the respective displays of the at least two wearable computing devices, which advises the at least two individuals to discontinue use of the at least one unmanned aerial vehicle and seek shelter, and wherein status alerts of the at least one unmanned aerial vehicle are displayed to the at least two individuals via the respective displays of the at least two wearable computing devices.

19. The computer program product of claim 18, further comprising:
   program instructions to determine the location and at least one quantitative attribute of the at least one individual based on the data;
   program instructions to determine at least one instruction for the at least one unmanned aerial vehicle based on the at least one quantitative attribute; and
   program instructions to communicate the at least one instruction to the at least one unmanned aerial vehicle.

\* \* \* \* \*